INVENTOR.
Herbert R. Klink
BY
Robert S. Dunham
ATTORNEY

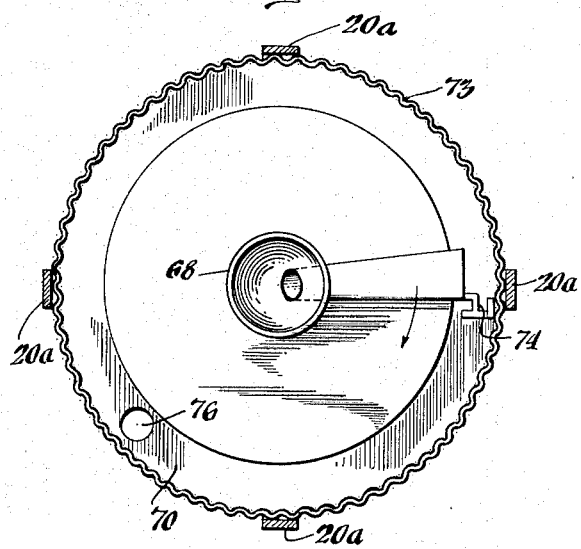
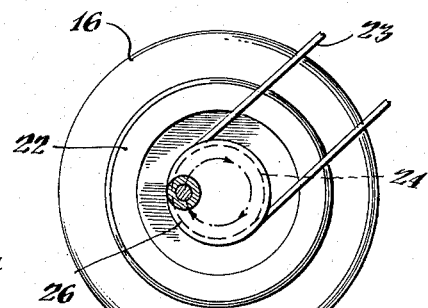
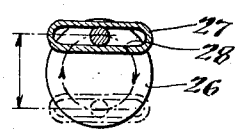
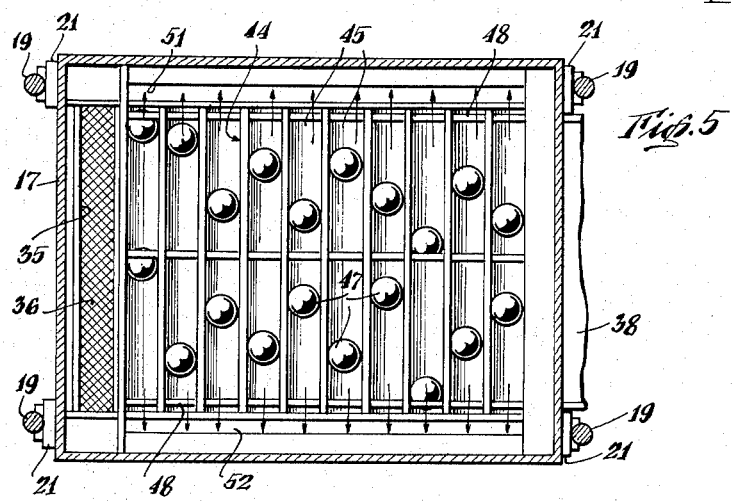
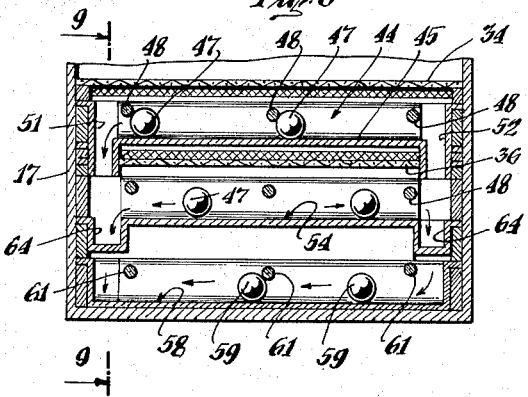
INVENTOR.
Herbert R. Klink
BY
Robert S. Dunham
ATTORNEY Jan. 10, 1956  H. R. KLINK  2,729,864
GRAIN STERILIZING APPARATUS
Filed April 25, 1951  6 Sheets-Sheet 1

Jan. 10, 1956    H. R. KLINK    2,729,864
GRAIN STERILIZING APPARATUS
Filed April 25, 1951    6 Sheets-Sheet 3
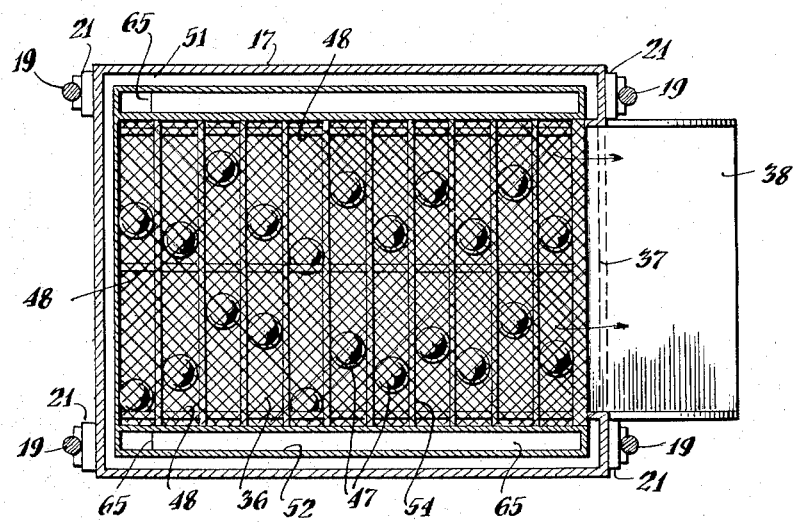
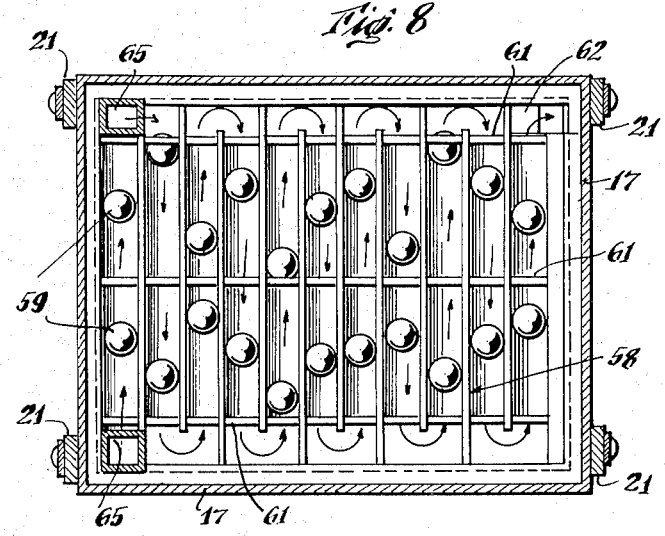
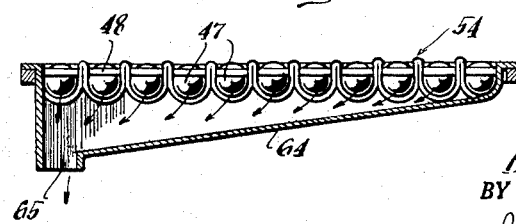
INVENTOR.
Herbert R. Klink
BY
Robert S. Dunham
ATTORNEY Jan. 10, 1956      H. R. KLINK      2,729,864
GRAIN STERILIZING APPARATUS
Filed April 25, 1951      6 Sheets-Sheet 4
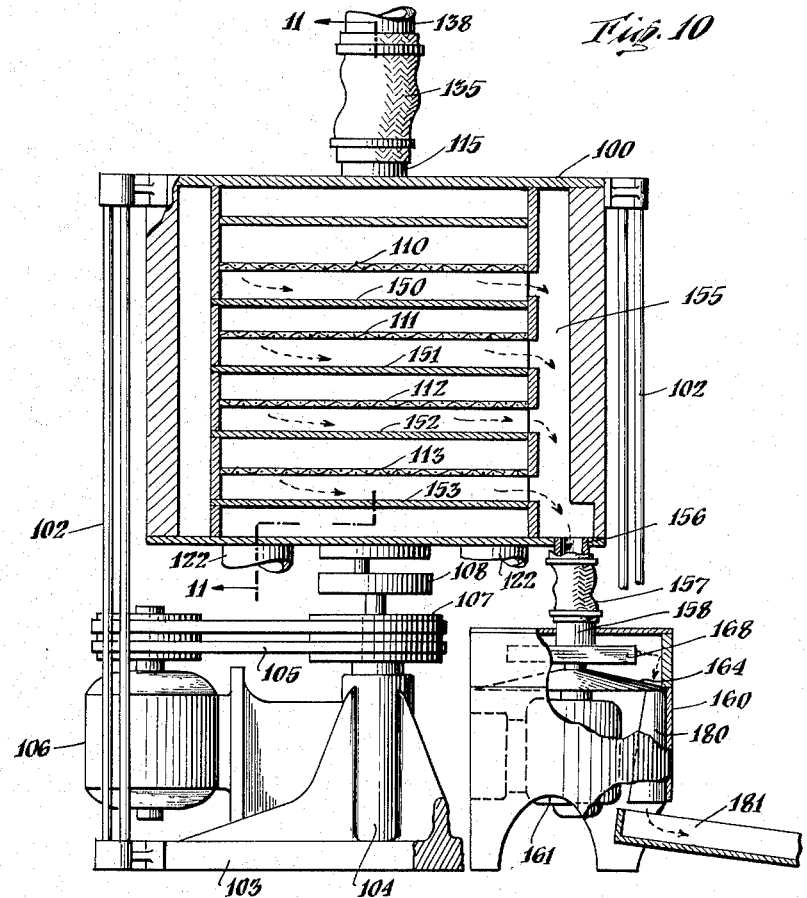
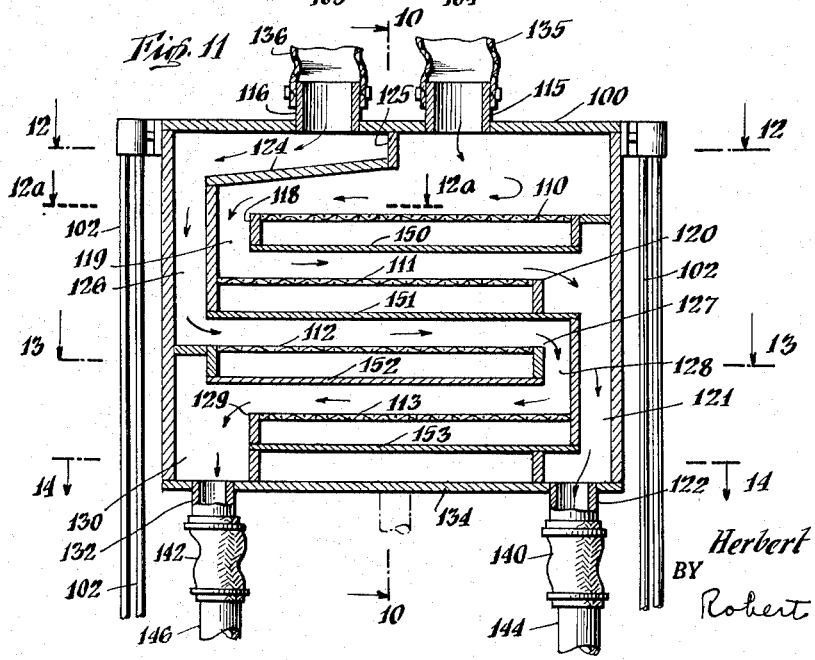
INVENTOR.
Herbert R. Klink
BY
Robert S. Dunham
ATTORNEY Jan. 10, 1956  H. R. KLINK  2,729,864
GRAIN STERILIZING APPARATUS
Filed April 25, 1951  6 Sheets-Sheet 5
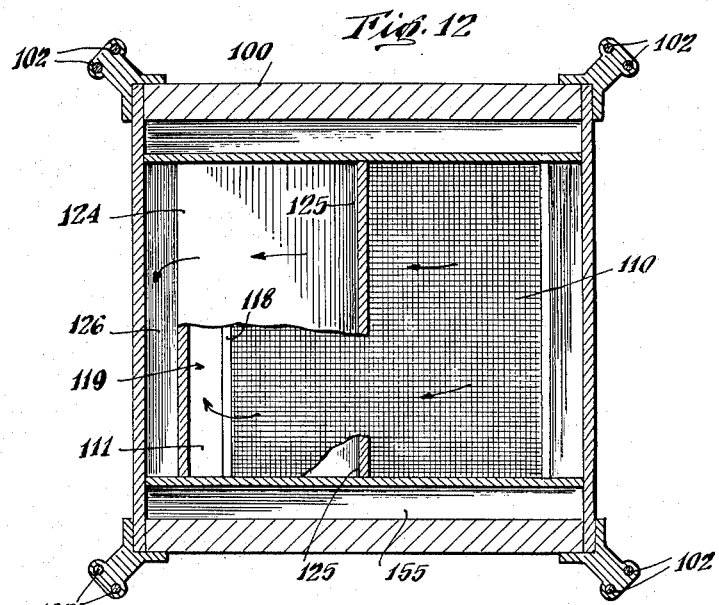
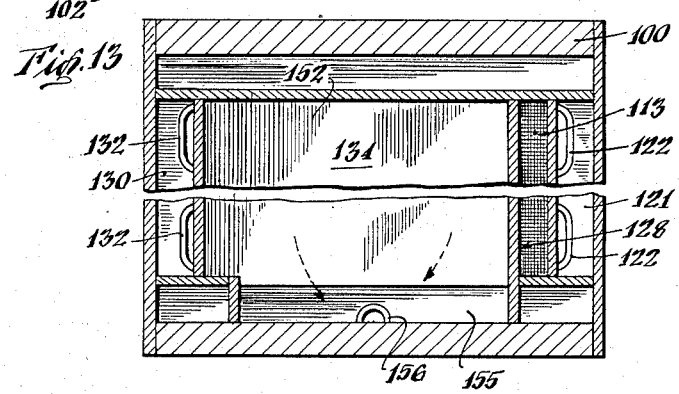
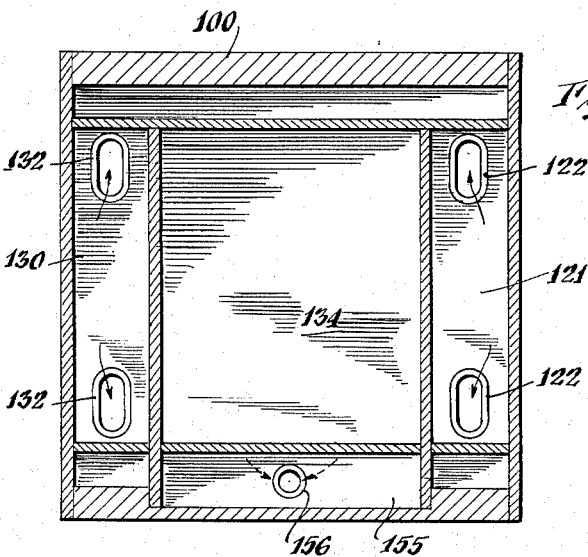
INVENTOR.
Herbert R. Klink
BY
Robert S. Dunham
ATTORNEY Jan. 10, 1956
H. R. KLINK
2,729,864
GRAIN STERILIZING APPARATUS
Filed April 25, 1951
6 Sheets-Sheet 6
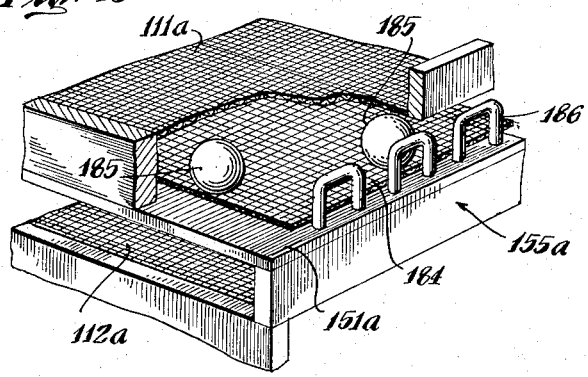
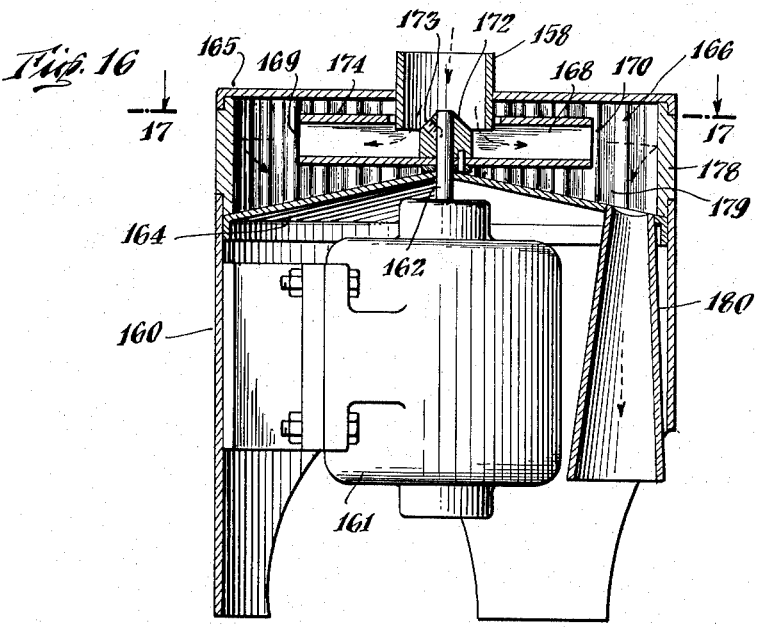
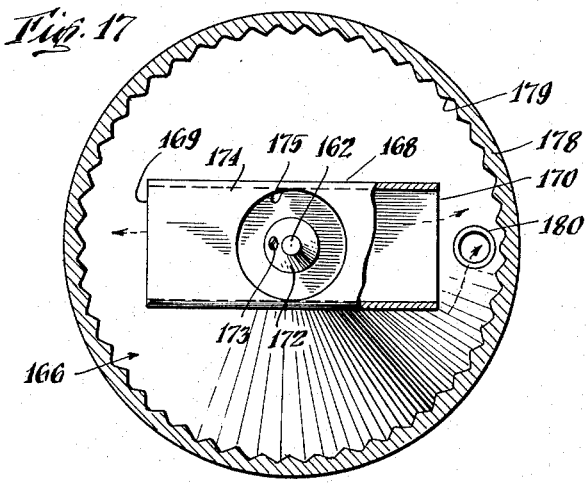
INVENTOR.
Herbert R. Klink
BY
Robert S. Dunham
ATTORNEY United States Patent Office 2,729,864
Patented Jan. 10, 1956

2,729,864

GRAIN STERILIZING APPARATUS

Herbert R. Klink, Roanoke, Va.

Application April 25, 1951, Serial No. 222,864

4 Claims. (Cl. 21—91)

This invention relates to a grain sterilizing process and the apparatus for effecting the same. More particularly, the invention relates to apparatus and procedure for removing and destroying insect infestation and the like from grain, e. g. wheat, corn and other grains, which quite commonly and indeed often unavoidably, during transportation or storage in elevators or mills, become contaminated with insects, the latter term herein generally meaning various forms of live infestation, including not only fully developed insects but larvae and insect eggs.

It is an object of the present invention to provide a sterilizing process and apparatus wherein the insects can be removed from grain upon the passing of the grain over a screen and wherein these insects, when once separated from the grain, will be effectively destroyed so that their return to the grain throughout the continuation of the grain through the apparatus will be prohibited and wherein the grain and the insects will be separately discharged into vessels, i. e. into means for collecting or conveying such separately discharged material, as may be desired.

A further object of the invention is to provide improved and effective means and methods whereby insect infestation is removed from grain and is positively killed by mechanical action, the apparatus affording effective cleaning of the grain with respect to other foreign matter, grain fragments that are likely to mold or deteriorate, and the like. Another object is to provide for the removal and disposition of insects without requiring the use of insecticidal chemicals of a character or in a manner that might produce undesirable odors or contamination of grain or of the flour, meal or other product manufactured by subsequent milling operation on the grain, the destruction of the insects being essentially or effectively complete so as to prevent their escape or loss into the other parts of the mill where they might breed, and the separation of the destroyed insects, broken grains or grain fragments and other separated matter being such as to permit recovery of such matter for any use (e. g. other than for human consumption) to which the same might be put. A still further object is to afford apparatus and procedure of the character described, wherein there is little or no breakage or other damage to the grain itself, e. g. to the kernels, berries or other whole or like particles of grain which it is sought to recover free of infestation and contamination, the invention thus providing essential, maximum economy in the recovery of the grain for milling or other use.

Other objects of the present invention are to provide a simple process for separating insects from grain and a simple apparatus for the same, which is easy to operate, inexpensive to manufacture and efficient in operation.

To these and other ends, the invention, in its presently preferred forms, resides in an apparatus for separating insects from grain and for destroying the same comprising a container, a screen extending across the container, means for causing the container to be shifted, insect-destroying means disposed beneath the screen within the container including a funnel, a device for rotating said funnel, said funnel being adapted to receive the insects and to fling them outwardly under the action of centrifugal force, a ring surrounding the funnel against which the insects will be flung whereby to kill the same.

More particularly, the invention comprises novel features and combinations of structure, including screening means adapted to pass insects while retaining grain on the screen, associated means to effect sifting of insects through the screen or screens and thus away from the grain, together with means for receiving the separated insect contamination and for flinging such material outwardly by centrifugal force in a manner sufficiently violent to kill the infestation (including larvae and eggs), the apparatus including provision for separately discharging the screened and cleaned grain, and the removed matter that consists of the destroyed insects and other unwanted particles. In a more general sense, the methods of the invention thus involve a process of separating and destroying insects within grain which consists of screening the grain to cause the insects to be separated therefrom, collecting the separated insects and flinging the insects against a wall under centrifugal action to effectuate their certain extermination.

For other objects and for a better understanding of the invention, reference may be had to the following detailed description taken in connection with the accompanying drawing, in which Fig. 1 is an elevational view of one embodiment, with portions broken away and shown in section to show the interior of the apparatus;

Figs. 2 and 3 are respectively transverse sectional views taken on lines 2—2 and 3—3 of Fig. 1, Fig. 3 omitting certain motor structure, for clarity of illustration;

Fig. 4 is a sectional view of a drive to provide back and forth motion;

Fig. 5 is a transverse sectional view taken on line 5—5 of Fig. 1;

Fig. 6 is a sectional view, in elevation, taken on line 6—6 of Fig. 1;

Figure 1:
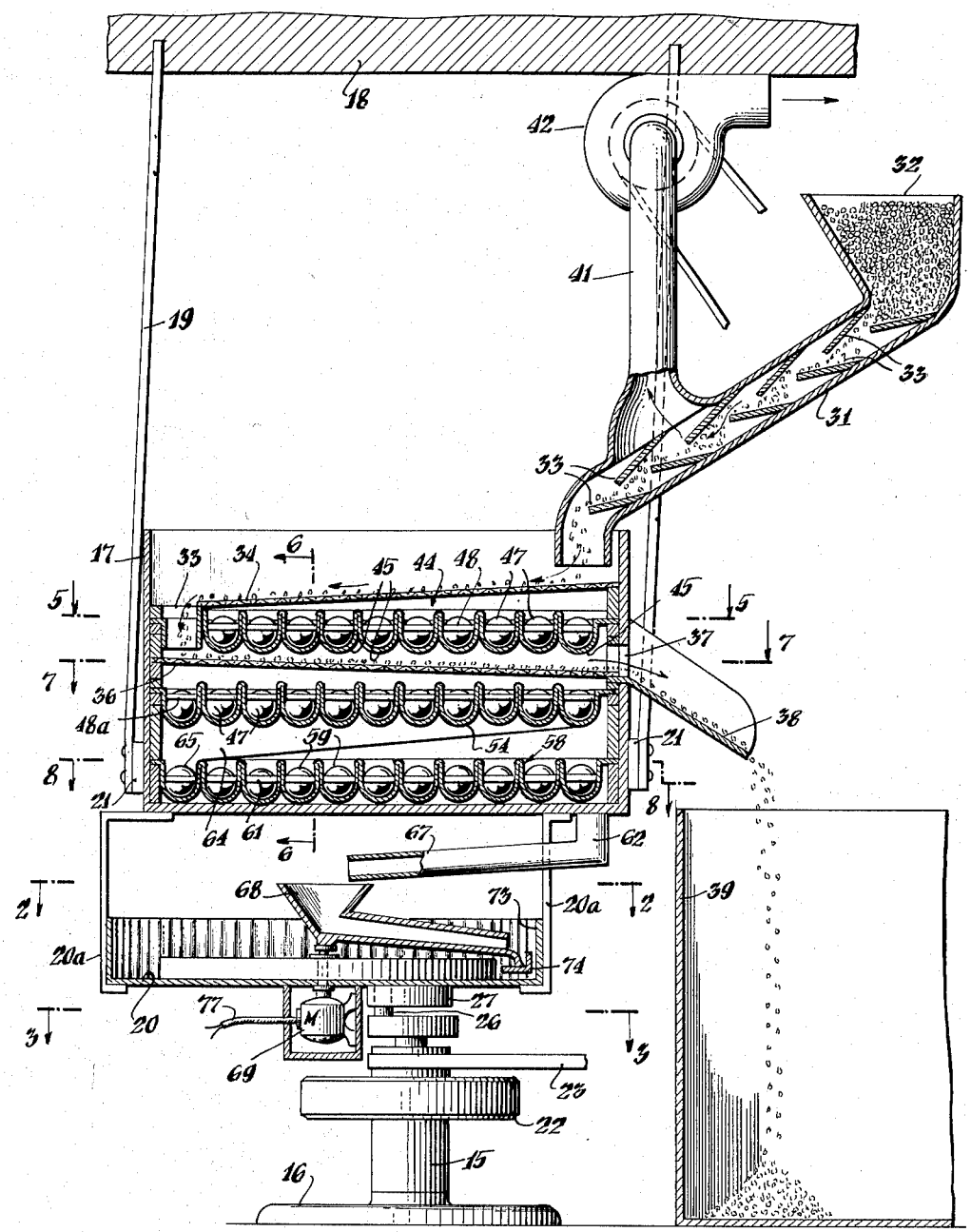

Figs. 7 and 8 are respectively transverse sectional views taken respectively on lines 7—7 and 8—8 of Fig. 1;

Fig. 9 is a fragmentary sectional view taken on line 9—9 of Fig. 6;

Fig. 10 is an elevational view of another embodiment of the invention, with some portions broken away and with the sifter assembly in vertical section as on line 10—10 of Fig. 11;

Fig. 11 is a vertical section on line 11—11 of the sifter portion of Fig. 10;

Fig. 12 is a transverse sectional view taken on line 12—12 of Fig. 11, with a portion broken away and certain parts shown as if in section on line 12a—12a of Fig. 11;

Figs. 13 and 14 are transverse sectional views taken respectively on lines 13—13 and 14—14 of Fig. 11;

Fig. 15 is an enlarged fragmentary detail, in perspective, with some structure broken away, showing additional elements preferably embodied in the screening assembly of the device of Figs. 10 and 11;

Fig. 16 is an enlarged view, chiefly in vertical section, of the insect-destroying means of Fig. 10, and Fig. 17 is a transverse sectional view on line 17—17 of Fig. 16.

It will be understood that the apparatus shown in the drawing is at least in part illustrated in a somewhat diagrammatic or schematic manner, omitting minor details of support, mounting and the like, which will be readily understood by persons skilled in the art.

Referring first to the embodiment shown in Figs. 1 to 9 inclusive, 15 represents a pedestal having a base portion 16 for supporting the apparatus from the floor or a part thereof which serves as the means for effecting motion to a vessel 17 suspended from a ceiling 18 by flexible supporting members 19 connected to the container 17 at the opposite sides thereof as indicated at 21. Specifically, the vessel 17 has mounted below it a pan 20, which is hung from the vessel by bars 20a as shown and which is directly connected with the agitating means on the pedestal, i. e. for effecting oscillatory or gyratory motion of the rigid assembly constituted by the vessel 17 and pan 20. On the pedestal is a rotatable fly wheel 22 adapted to be driven by a belt 23 extended to any rotary motion source and extended over a pulley 24. At the top of the fly wheel there extends a crank wheel 26 which has a pin extending into a coupling member 27 fixed to the bottom of the pan 20. As the crank wheel 26 is turned, the container 17 (along with the pan 20, to which the container is secured) will therefore be given a circular or gyratory motion. If the member 27 is provided with a slot 28 as shown in Fig. 4, the conatiner will be given straight back and forth motion.

Extending above the vessel 17 and from one side thereof is a chute 31 having a large funnel opening 32 into which grain to be cleaned is extended. Within the chute 31 are a series of staggered baffles 33 over which the grain passes under gravity to the lower end of the chute to be dropped onto a top screen 34 which is of a mesh such as to retain the grain particles but will allow the small insects to be sifted through the same. The screen mesh which is used is between 10 and 14 openings per linear inch, it being understood that the mesh may depart from the stated range in many cases, not only depending on the size of the grain particles to be retained on the screen, but also depending on other factors, including the size of wire employed in the screen, for example in that screens having 8 or 9 openings per linear inch have often been found satisfactory. This screen 34 is arranged to have a slight pitch from one side toward an opening 35 at the opposite side through which the grain may fall for travel over a reversely arranged screen 36. This last screen extends to an opening 37 at the first side of the container where the clean grain will be discharged over a chute 38 to a vessel 39 on the floor.

Extending upwardly from the chute 31 is a tube 41 connected with a blower 42 from which dust and chaff taken out of the grain as it descended through the chute 31 is blown.

As the grain travels downward over the screen 34 most insects thereon drop through the screen onto a tray 44 having a plurality of transverse channels 45 therein and freely rotatable balls 47 in the channels crush the insects. The gyratory motion of the container causes the balls to roll back and forth in the channels between the resilient cross bars 48. This motion also causes the insects to travel toward the sides where they drop through open channels 51 and 52, and as noted in Fig. 6, they drop from the channels 51 and 52 to sloping troughs 64, which are shown in detail in Fig. 9.

As the grain continues to travel over the screen 36 additional insects drop therethrough into another series of channels 54 which are also provided with freely rotatable balls and resilient stops 48 that limit the movement of the balls. The insects that drop into the channels 54 also travel toward the sides and drop into the troughs 64 from which they drop through chutes 65 into a bottom tray 58 having alternately disposed channels with balls 59 therein. The balls 59 are also free to travel in the channels between the resilient stops 61. The gyratory action will cause the insects to travel along one channel and back in the next channel, and this motion is continued until the insects and other foreign matter deposited in the tray reach the far end of the tray where they drop into a chute 62.

The chute 62 is provided with an extension 67 that opens into a funnel 68 which is carried by a shaft of a motor 69 whereby a chute extending from the funnel travels around the pan 20. The pan 20 is formed with a corrugated wall 73 and a circumferential recess in which a scraper 74 carried by the end of the chute of the funnel 68 is provided adjacent the wall so that insects that may still be alive may be crushed between the scraper and wall. That is to say, the structure illustrated in Figs. 1 and 2 provides additional means for destroying the insects as the centrifugal force resulting from the rotation of the funnel and the chute thereof throws the insects against the corrugated wall with such force that the impact will instantly kill the insects. Ordinarily, it is found that the violent impact of the insects against the wall is sufficient to destroy them very effectively, although the additional function of the scraper 74 may be employed if desired. It is believed that the corrugated nature of the wall 73, although not essential in all cases, contributes in a significant and unusually important manner to the effective extermination of all forms of infestation, specifically in providing abutments of highly effective shape against which the insects are projected.

From the circumferential recess in the lower part of the pan, the resulting insect debris and other material will drop through a passage 76 (Fig. 2) for appropriate collection and disposition. Current is supplied to the motor 69 through a flexible cable 77.

With the parts arranged in this manner the continuous shaking of the device causes the insects to drop through the screens and also causes the rollers to travel back and forth, and as the rollers or balls are metal or made of a comparatively heavy material the insects will be crushed by impact of the balls with the rounded lower portions of the channels. As stated above, a particularly important feature of the illustrated apparatus, being a feature of specific utility in the described combination and without the ball weights 47 and 59, is the centrifugal mechanism including the rotating funnel 68 for killing the infestation by projection against the annular wall 73.

Figs. 10 to 17 inclusive illustrate another embodiment of the invention, which includes, nevertheless, the same essential elements described hereinabove for separating the contamination from the grain and for destroying such infestation by the action of centrifugal force. Referring particularly to Figs. 10 to 14, the apparatus includes a screening or sifting assembly housed in the vessel or box 100, which is arranged to be moved with a gyratory or like motion, in a manner similar to the vessel 17 of Fig. 1. Although the sifter 100 may be flexibly mounted from the ceiling like the vessel 17, Figs. 10 and 11 show its upper four corners connected to bars or flexible rods 102 which rise from the base 103 of the supporting pedestal 104, which rests on the floor. Through belt means 105 driven by a motor 106 and turning a pulley 107, the crank wheel 108 or equivalent means, provides oscillating or gyratory motion for the sifter box 100, in essentially the same manner as a driving mechanism described above for the vessel 17.

The sifter box 100 encloses a set of screens corresponding generally to the screens in Fig. 1 and here respectively designated 110, 111, 112, and 113 disposed in a generally horizontal relation, the shaking motion of the assembly being adequate to carry the grain essentially continuously across and over the unobstructed end of each screen as described below. While the screens in these and other embodiments of the invention may be grouped in various ways (including one or more groups each comprising any of various numbers of screens) the device of Figs. 10 and 11 embodies the screens in an arrangement of two groups, respectively adapted to handle grain from two inlet passages or conduits 115, 116. Thus as will be apparent from Fig. 11, grain entering through the inlet 115 falls on uppermost screen 110, traveling along the latter to fall over its end 118 into an intermediate vertical channel 119 and thence upon one end of the screen 111. Grain thereupon travels across the screen 111 (below the screen 110) and falls over the end 120 of screen 111, to discharge through the vertical channel 121 and finally into the outlet conduits 122, there being conveniently two such conduits, of oval shape, for cooperation with the structural arrangement of the sifter assembly.

Grain received through the other inlet passage 116 is carried by a partitioning shelf 124 which is arranged with the intermediate wall 125 so as to be separated from the path of grain from the inlet 115. From the inlet shelf 124, the grain drops through a vertical channel 126 to be received on the screen 112. After traveling across the screen 112, the grain falls over the end 127 of the latter, down through the vertical channel 128, upon the screen 113, for traversal of the latter. Reaching the end 129 of the screen 113, the grain falls through the channel 130, to be discharged through the outlet conduits 132, conveniently identical with the outlets 122, and identically arranged at the opposite side of the bottom 134 of the box 100. It will therefore be seen that two streams of grain (e. g. wheat, corn or other grain) to be separated from insect infestation and the like, may be continuously received and each continuously passed over two screens in succession, for ultimate, separate discharge through the passages 122 and 132 respectively.

Connections between the various inlet and outlet conduits to spouts or other ducts in the mill are conveniently effected with means such as the conventional, flexible fabric tubing, called stockings. Thus the inlets 115, 116 are connected by stockings 135, 136 to appropriate feed ducts, such as the chute or conduit 138 indicated in Fig. 10 as connected to the inlet 115. Likewise the several outlets 122 and 132 are similarly connected by stockings to further chutes or ducts whereby the cleaned grain is delivered to a desired locality of storage or subsequent treatment, such connections being exemplified by the stockings 140, 142 in Fig. 11, respectively extending to the further, stationary conduits 144, 146. In the described fashion, the gyratory or shaking motion of the sifter assembly may be effected, the stockings having sufficient flexibility to maintain continuous, non-leaking connection with the stationary inlet and outlet means as exemplified at 138, 144 and 146.

The several screens 110 to 113 inclusive are respectively associated with collecting pans or trays 150, 151, 152 and 153, each comprising principally a flat structure of sheet metal or the like mounted a short distance below its corresponding screen, to receive the insect and other contamination that falls through the screen. As will be apparent from Figs. 10 to 14 inclusive, appropriate partitioning means are provided at the ends of trays 150 to 153 and likewise as desired at the sides of the screens and trays, together with horizontal channel partitions as needed, so that the paths for travel of grain are wholly separated from the spaces immediately beneath the screens and so that the material collected in the pans has no access to the grain paths. Specifically, the trays or pans 150 to 153 are arranged (as shown in Fig. 10) to discharge over their side edges, conveniently at the same side edge of each, into a common vertical channel 155, the insect and other separated material thus passing down through an outlet conduit 156, which is connected by a flexible stocking 157 to the inlet conduit 158 of centrifugal insect-destroying means conveniently identified by its housing 160.

Thus as previously indicated, two streams of grain are carried through the sifter assembly, for discharge through the conduits 122, 132, and the operation of the sifter separates insects and like material, collected through the channel 155 and discharged through the flexible conduit 157 into the centrifugal apparatus 160. For convenience of illustration, the paths of grain through the apparatus is indicated by solid arrows in Fig. 11, the paths of insect material being indicated by dotted arrows in Fig. 1, similar representation being also employed in the horizontal sectional views Figs. 12, 13 and 14. As will now be understood, the mesh of the screens 110 to 113 is such as to retain the desired grains, while permitting insect infestation to pass, one example of a suitable size for wheat or larger grains being a mesh of 8 or 9 openings to the linear inch, finer mesh being sometimes nevertheless satisfactory.

Referring more particularly to Figs. 10, 16 and 17, the housing 160 encloses an electric motor 161 which has its drive shaft 162 projecting upwardly through the central apex of a shallow, cone-shaped, generally horizontal partition 164, the partition 164 thus cooperating with the top 165 of the housing, to constitute a shallow, generally cylindrical chamber 166. Within the chamber 166 the shaft 162 carries a funnel or conduit device generally designated 168 and equivalent to the rotating funnel 68 of Fig. 1. While such projecting funnels may have one or other numbers of outlets, the rotor 168 in Figs. 10, 16 and 17 conveniently comprises a flat tubular structure of sheet metal or the like, rectangular in cross-section and arranged to have diametrically opposite outlet openings 169, 170, spaced from the center of the rotor, where the latter is secured to the shaft 162 by appropriate means including the collar 172 and set screw 173. The upper wall 174 of the rotor funnel has a circular opening 175 into which the inlet duct 158 projects, with appropriate clearance for rapid rotation of the funnel 168.

It will thus be seen that as the motor 161 rotates the funnel 168 at high speed, insects received through the inlet 158 are projected outwardly through the openings 169, 170, with great centrifugal force. The projected insects are received by the annular, generally cylindrical wall section 178, which surrounds the chamber 166 and which is preferably provided with vertical corrugations 179 around its inner face, to promote the lethal effect of impact upon the projected insects. After falling from the wall 178, the destroyed insects and insect fragments collect on the shallow cone 164, and are swept or blown around to discharge through the chute or conduit 180, opening (as shown) through one side of the cone partition. From the discharge spout 180 the insect and other debris may be appropriately collected and removed, for example as by the chute 181 in Fig. 10.

The operation of the apparatus of Figs. 10 to 17 inclusive will now be readily apparent in view of the foregoing description and in view of the correspondence with like elements of the apparatus of Fig. 1. The grain is continuously introduced through the inlets 115, 116 to the sifter assembly, traveling across the screens of one or the other of the two groups, the violent gyratory or shaking motion cooperating to advance the grain and facilitate the sifting function. The grain, freed of insect infestation and other undesired matter is continuously discharged through outlets 122, 132, while the insect and other contamination thus sifted from the grain falls through the channel 155 and directly into the centrifugal device 160. There the rotating funnel 168, turning at a conveniently high speed (such as about 3400 R. P. M., or more generally, upwards of about 3000 R. P. M.) projects the insects violently outward or radially through the openings 169, 170. Carried by centrifugal force, e. g. in directions having radial and tangential components, the insects strike the wall 168 with violent impact, effectively sufficient to destroy them, i. e. indeed to kill larvae, eggs and the like, as well as fully developed creatures. After the exterminating function of the centrifugal device, the insect debris, together with other material and including broken grains or grain fragments such as may originally have been present in the grain supplied through inlets 115, 116, falls through the outlet 180 for collection and removal, wholly separately from the grain. As explained hereinabove, the centrifugal devices such as shown in Figs. 1 and 2, and Figs. 10 to 17, have been found highly efficient for essentially thorough killing of the insect infestation, and thus in combination with the screening instrumentalities, afford an eminently satisfactory unit for the removal and destruction of insect infestation in grain.

Fig. 15 shows, in simplified manner, a further feature which may be embodied in the apparatus of Fig. 10 to promote the sifting action. Using similar reference numbers to identify corresponding parts, Fig. 15 shows one of the screens 111a over which the grain travels and through which the insect infestation is sifted to the underlying pan or tray 151a. Intermediate these elements, and conveniently a short distance above the pan, coarse or open-meshed screen 184 is disposed, to support several freely rolling balls 185 of rubber or the like, which may have a diameter slightly less than the vertical distance between the screens 184 and 111a. An appropriate fence 186 is provided along the open end of the pan 151a, so as to prevent the balls from escaping at the open side of the pan while permitting the collected insects and the like to pass freely into the channel region indicated at 155a. As the sifter assembly is subjected to shaking or oscillation, as by the means shown in Fig. 10, the balls 185 (of which two are shown and of which a few others may be provided if desired) roll violently about on the screen 184, continuously bouncing against the screen 111a so as to vibrate the latter and agitate the grain in a corresponding fashion. In this way, the sifting action is promoted and accelerated, for optimum separation of the insects and other contaminating particles from the grain. It will be understood that in all other respects the structure exemplified in Fig. 15 may be identical with the structure of Figs. 10 to 14 (including further screens as shown at 112a); indeed it is contemplated that each of the screens 110 to 113 in Figs. 10 and 11 is preferably associated with ball agitating means of the sort illustrated in Fig. 15.

This application is a continuation-in-part of my co-pending application Serial No. 2,760, filed January 16, 1948, for Grain Sterilizing Process, now Patent No. 2,637,624.

It is to be understood that the invention is not limited to the specific embodiments herein shown and described but may be carried out in other ways without departure from its spirit as defined by the following claims.

I claim:

1. In an insect remover and destroyer for grain and the like, a screen box, a plurality of screens the mesh of which is adapted to pass insects while retaining grain positioned in said screen box and arranged to receive grain in succession for sifting insects from the grain, insect removing means in said screen box adapted to receive the sifted insects from the screens and convey said insects to another locality adjacent the screen box, means feeding grain to the screen box, agitating means for shaking the said screens, and means communicating with said screen box and adapted to receive insects from said removing elements at said other locality while the agitating means is shaking the screens, for destroying the insects, said insect-destroying means comprising an insect-receiving conduit structure defining a path for the insects and mounted for rotation about an axis at an angle to said path for flinging the received insects through the conduit structure and outwardly thereof by centrifugal force, said conduit structure having an outer open end spaced from said axis, through which the insects are flung, means for rotating said conduit structure, and wall means surrounding said rotating conduit structure outside the path of revolution of said outer end, to be impinged by the insects flung outwardly from said conduit structure, for destroying the insects.

2. In an insect remover and destroyer for grain and the like, screen means adapted to receive insect contaminated grain and having a mesh to pass the contaminating insects while retaining the grain on the screen, means for shaking the screen means to effectuate separation of insects by passage therethrough, means for conducting the grain away from the screen means after separation of insects therefrom, and insect-receiving means disposed beneath the screen means, including means for destroying the received insects, said insect-receiving means including insect-receiving tubular conduit structure defining a path for the insects and mounted for rotation about an axis at an angle to said path for flinging the received insects through the tubular conduit structure and outwardly thereof by centrifugal force, said conduit structure having an outer open end spaced from said axis, through which the insects are flung, means for rotating said conduit structure, and wall means surrounding said rotating conduit structure outside the path of revolution of said outer end, to be impinged by the insects flung outwardly from said conduit structure, for destroying the insects, said wall means having corrugations on its interior surface, said corrugations extending substantially parallel to the aforesaid axis and having their sides disposed for violent impingement by the centrifugally-flung insects.

3. An insect remover and destroyer for grain, comprising means including screen means adapted to receive successive portions of grain, for sifting insects from the grain, said screen means being adapted to retain grain and pass the insects, associated means for discharging grain from the screen means, means collecting the insects sifted from the grain, a conduit structure adapted to receive insects from said collecting means and having inner and outer ends, said conduit structure being arranged to define a path for the insects and mounted for rotation about an axis adjacent the said inner end and at an angle to said path for flinging the received insects through the conduit structure and outwardly through said outer end thereof by centrifugal force, means for rotating said conduit structure and wall means surrounding said rotating conduit structure outside the path of revolution of said outer end, to be impinged by the insects flung outwardly from said conduit structure, for destroying the insects, said conduit structure comprising a tubular passage extending substantially radially of said axis of rotation in a direction substantially perpendicular to said axis, and shaped to direct the insects outwardly under full centrifugal force through the outer end of the conduit structure, for flinging the insects destructively against the wall means.

4. An apparatus for separating insects from grain and for destroying the same, comprising means including screen means adapted to receive successive portions of grain, for sifting insects from the grain and discharging the grain from which insects have been sifted, said screen means being adapted to retain grain and pass the insects, means for receiving from the screen means the insects that have been sifted from the grain, including a funnel, means for rotating the funnel, said funnel being adapted to receive the insects and to fling them outwardly under the action of centrifugal force, and annular wall means surrounding the funnel against which the insects will be flung whereby to kill the same.

References Cited in the file of this patent

UNITED STATES PATENTS

| | | |
|---|---|---|
| 409,180 | Gerguson et al. | Aug. 20, 1889 |
| 974,393 | Kassmodel | Nov. 1, 1910 |
| 994,960 | Sovereign | June 13, 1911 |
| 1,229,236 | Cross | June 12, 1917 |
| 1,532,742 | Hadsel | Apr. 7, 1925 |
| 1,670,714 | Craig | May 22, 1928 |
| 2,339,734 | Smith | Jan. 18, 1944 |
| 2,339,735 | Smith | Jan. 18, 1944 |

FOREIGN PATENTS

| | | |
|---|---|---|
| 184,609 | Great Britain | Aug. 24, 1922 |